(12) United States Patent
Schoemann et al.

(10) Patent No.: US 7,073,843 B2
(45) Date of Patent: Jul. 11, 2006

(54) TRIM PANEL ASSEMBLY AND METHOD OF MANUFACTURE

(75) Inventors: Michael P. Schoemann, Waterford, MI (US); Glenn A. Cowelchuk, Chesterfield Township, MI (US); John D. Youngs, Southgate, MI (US); Randy S. Reed, Fair Haven, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/818,960

(22) Filed: Apr. 6, 2004

(65) Prior Publication Data

US 2005/0218694 A1    Oct. 6, 2005

(51) Int. Cl.
*B60J 5/00*      (2006.01)
*B60R 7/04*      (2006.01)
(52) U.S. Cl. .................. 296/146.7; 296/37.13
(58) Field of Classification Search ............ 296/146.7, 296/37.13
See application file for complete search history.

(56) References Cited

U.S. PATENT DOCUMENTS

| 5,736,689 | A  | * | 4/1998 | Van Hout et al. ........... 181/141 |
| 5,932,331 | A  | * | 8/1999 | Jones et al. ................. 428/218 |
| 6,377,695 | B1 |   | 4/2002 | Azima et al. |
| 6,412,852 | B1 |   | 7/2002 | Koa et al. |
| 6,533,880 | B1 |   | 3/2003 | Van Manen |
| 6,533,980 | B1 |   | 3/2003 | Van Manen |
| 6,578,658 | B1 | * | 6/2003 | Jones et al. ................. 181/141 |
| 6,582,000 | B1 |   | 6/2003 | Siler et al. |
| 6,660,201 | B1 |   | 12/2003 | Van Manen |
| 6,676,879 | B1 |   | 1/2004 | Azima |
| 6,714,656 | B1 | * | 3/2004 | Coffin ........................ 381/420 |
| 6,880,874 | B1 | * | 4/2005 | Kallenberger et al. ... 296/37.13 |
| 2003/0066596 | A1 |   | 4/2003 | Van Manen |
| 2003/0201571 | A1 |   | 10/2003 | Davis, Jr. et al. |

\* cited by examiner

*Primary Examiner*—Dennis H. Pedder
(74) *Attorney, Agent, or Firm*—Brooks Kushman P.C.

(57) ABSTRACT

A trim panel assembly and a method of manufacture. The trim panel assembly includes a trim panel and a backplate. The trim panel includes a speaker grill that allows sound to transmit from a speaker into the interior of a vehicle. The backplate is attached to the trim panel and includes a speaker mounting portion located adjacent to the speaker grill and a seal located adjacent to the speaker mounting portion that is configured to inhibit sound leakage.

16 Claims, 2 Drawing Sheets

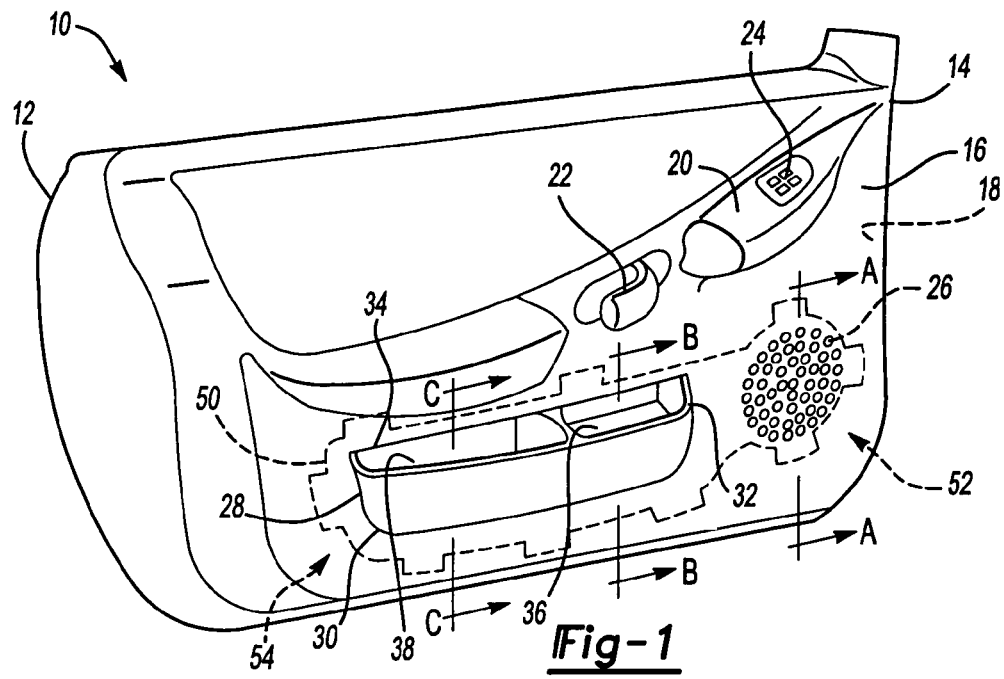
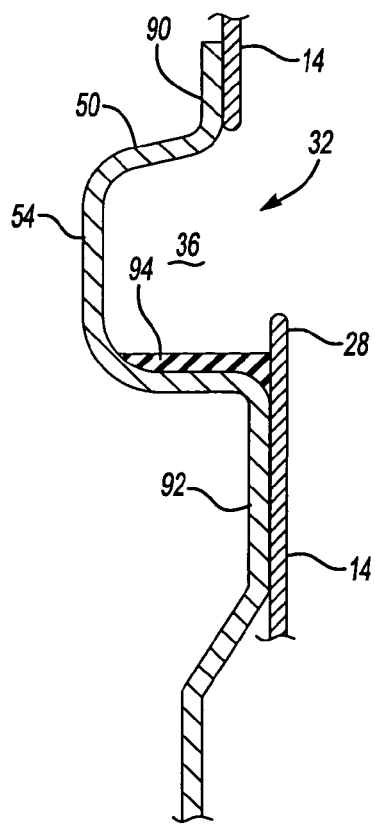
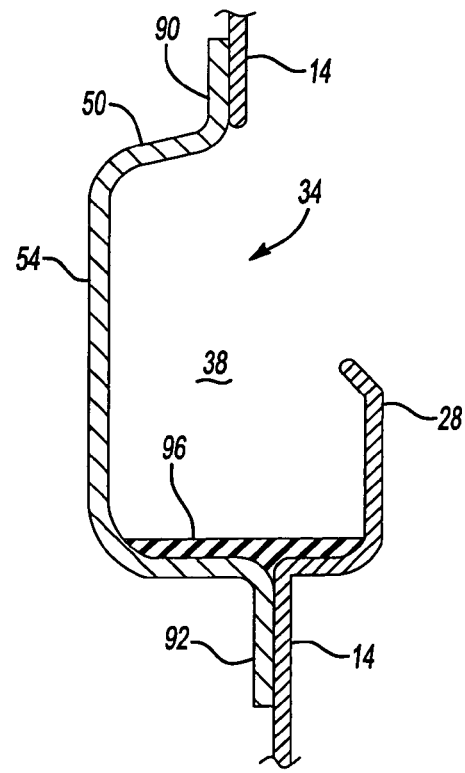

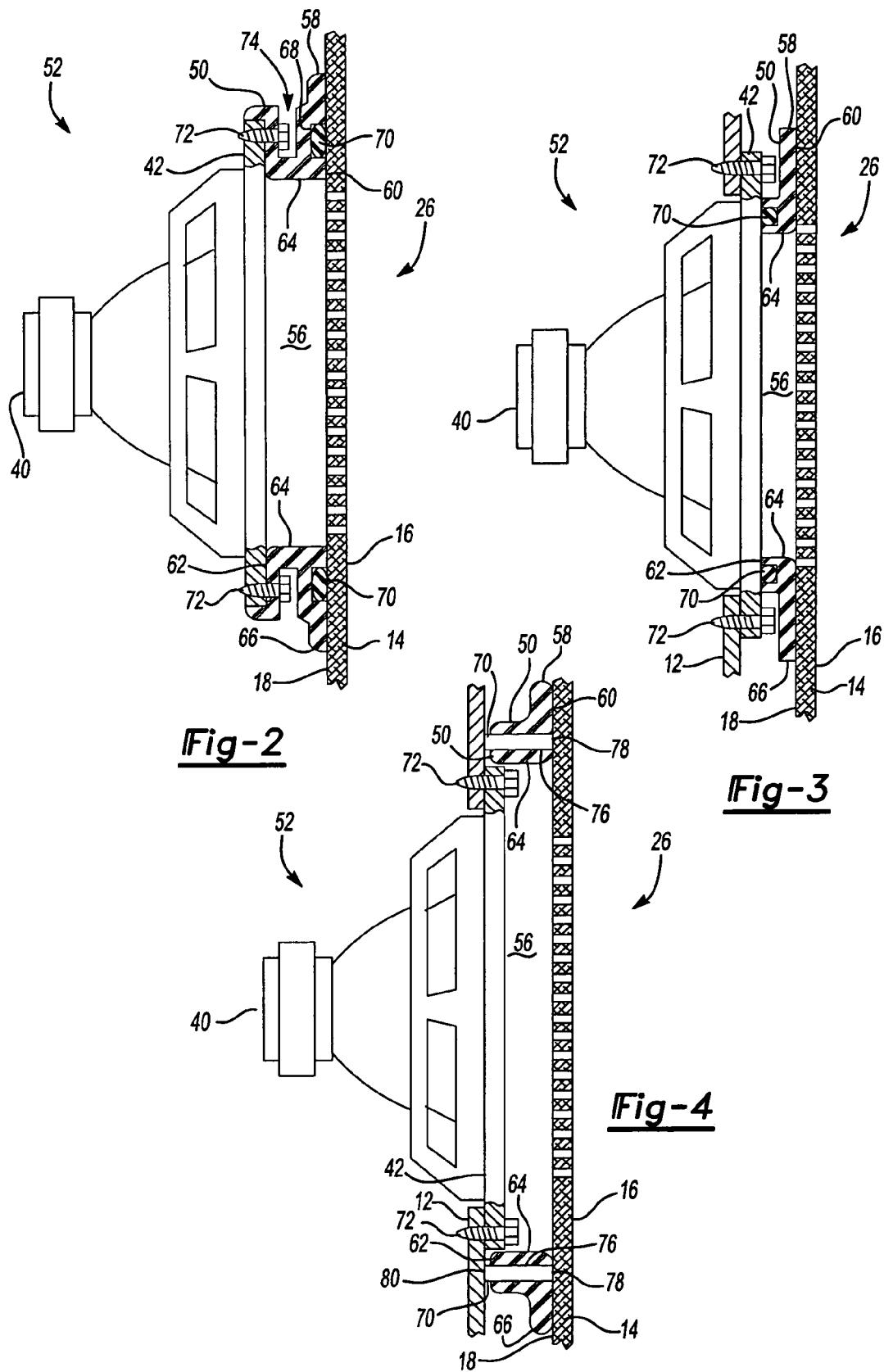

TRIM PANEL ASSEMBLY AND METHOD OF MANUFACTURE

BACKGROUND OF THE INVENTION

1. Field of the Invention

The present invention relates to a trim panel assembly for a vehicle and a method of manufacture for a trim panel assembly.

2. Background Art

Vehicle trim panels on doors and/or instrument panels may include a speaker grill that permits sound to transmit from an audio speaker to the interior of a vehicle. The speaker may be mounted apart from the speaker grill such that a void is created as described in U.S. Pat. No. 6,582,000. These voids can result in degraded audio quality.

Vehicle trim panels may also include storage compartments for holding various objects. These objects tend to slide in the storage compartment in response to vehicle movement. This sliding can result in undesirable noises, such as bangs, squeaks, and rattles.

SUMMARY OF THE INVENTION

According to one aspect of the present invention, a trim panel assembly for a vehicle is provided. The trim panel assembly includes a trim panel having a speaker grill, a speaker disposed proximate the speaker grill, a backplate, and a seal. The backplate includes an aperture configured to channel sound from the speaker to the speaker grill and a flange surrounding the aperture. The backplate is attached to the trim panel along a portion of the flange. The seal is disposed on the backplate to inhibit sound leakage and is integrally formed with the backplate.

The speaker may be attached to a second panel that is attached to the trim panel or the backplate. The backplate may be attached to the trim panel along a portion of the flange located between the seal and an outer edge of the backplate.

The seal may be disposed on the flange and compress against the trim panel or may compress against the speaker. A portion of the seal may extend through a hole in the backplate and protrude from the hole to provide sealing surfaces on opposite sides of the backplate.

The trim panel assembly may include a storage container. The storage container may have a front wall and a back wall. The front wall may be defined by a protruding portion of the trim panel. The back wall may be defined by a recessed portion of the backplate.

According to another aspect of the invention, a trim panel assembly for a vehicle is provided that includes a trim panel, a speaker, and a backplate. The trim panel includes a first surface, a second surface, a speaker grill, and a protruding portion. The first surface is configured to face toward the interior of the vehicle. The second surface is disposed opposite the first surface. The protruding portion extends toward the interior of the vehicle and includes an access slot. The speaker is disposed proximate to the speaker grill. The backplate is attached to the second surface and includes a speaker mounting portion, a seal, a recessed portion, and a liner. The speaker mounting portion is located adjacent to the speaker grill and is disposed between the speaker and the trim panel. The seal is disposed on the backplate adjacent to the speaker mounting portion and is configured to inhibit sound leakage. The recessed portion is located adjacent to the protruding portion. The recessed portion cooperates with the protruding portion to define a storage compartment. The liner is integrally molded in the bottom of the storage compartment. The seal and the liner are simultaneously formed from a common material.

The backplate may be attached to the second surface along a flange portion. The backplate may include an aperture configured to channel sound from the speaker to the trim panel such that the speaker is disposed in the aperture and the seal is disposed between the backplate and the inner panel. The speaker may be attached to a second panel.

The seal may be located between the flange portion and the second surface or may be located between the speaker and the backplate. The seal may extend through an opening in the backplate to provide a first sealing surface disposed adjacent to the trim panel and a second sealing surface disposed adjacent to the second panel. The seal may be disposed in a groove in the backplate.

According to another aspect of the invention, a method for manufacturing a trim panel assembly is provided. The method includes providing a multi-shot injection molding mold. A first material is injection molded to form a backplate in a first shot in the mold. A second material is injection molded to form a seal on a backplate flange in the second shot of the mold.

The step of injection molding the second material to form the seal may include injection molding a liner in the storage compartment. The step of injection molding the second material may include injection molding the second material into a groove disposed on the flange such that the seal fills the groove and extends above the flange. A portion of the injection molding mold may be actuated after the first shot to create a relief cavity for the seal.

BRIEF DESCRIPTION OF THE DRAWINGS

FIG. 1 is a perspective view of a vehicle closure having a trim panel assembly.

FIG. 2 is a section view showing one embodiment of a speaker mounting portion of the trim panel assembly.

FIG. 3 is a section view showing a second embodiment of the speaker mounting portion of the trim panel assembly.

FIG. 4 is a section view showing a third embodiment of the speaker mounting portion of the trim panel assembly.

FIG. 5 is a section view showing a storage compartment of the trim panel assembly.

FIG. 6 is a section view showing another embodiment of the storage compartment of the trim panel assembly.

DETAILED DESCRIPTION OF THE PREFERRED EMBODIMENT(S)

Referring to FIG. 1, a closure 10 for a vehicle is shown. A vehicle closure is an assembly that is movably attached to a vehicle body and is configured to cover one or more body openings when disposed in a closed position. Vehicle closures include doors, hatchbacks, and other components. In the embodiment shown in FIG. 1, the closure 10 is configured as a vehicle door.

The closure 10 includes an outer panel 12 and an inner panel 14. The outer panel 12 may form an exterior vehicle surface. The outer panel 12 may have any have any suitable configuration and may be made of any suitable material, such as fiberglass, a polymeric material, or a metal like steel or aluminum.

The inner panel 14 is configured to face the interior of the vehicle and may be attached to the outer panel 12. More specifically, the inner panel 14 includes a first surface 16 configured to face toward the interior of the vehicle and a second surface 18 disposed opposite the first surface 16. The inner panel 14 may include various features and trim surfaces, such as an arm rest 20, a door handle 22, lock and/or window controls 24, and a speaker grill 26. The inner panel 14 may also include a protruding portion 28 and one or more openings that help define a storage compartment 30. In the embodiment shown, the inner panel 14 includes first and second openings 32, 34 that are configured to provide access to first and second pockets 36, 38, respectively.

Referring to FIGS. 1 and 2, the speaker grill 26 is configured to allow sound to transmit from a speaker 40 to the interior of the vehicle. The speaker grill 26 may have any suitable configuration. For example, the speaker grill 26 may have a mesh construction or may include a plurality of small openings. Alternatively, the speaker grill 26 may be a porous material, such as fabric or foam, that permits sound transmission of suitable acoustic quality.

The speaker 40 may be of any suitable type or configuration. The speaker 40 may include a mounting plate 42 and be connected to a vehicle audio system (not shown).

A backplate 50 is disposed between the outer and inner panels 12, 14. The backplate 50 may be made of any suitable material, such as polymeric material like polypropylene. The backplate 50 may include a speaker mounting portion 52 and a recessed portion 54 that cooperates with the protruding portion 28 to define the storage compartment 30.

The speaker mounting portion 52 includes an aperture 56 and at least one flange 58. The aperture 56 is configured to permit sound to travel from the speaker 40 to the speaker grill 26. The flange 58 is disposed around the aperture 56. The flange 58 includes an inner surface 60, an outer surface 62, an aperture edge 64, and a perimeter edge 66. Optionally, the flange 58 may also include one or more grooves 68 adapted to receive a seal 70. In addition, the flange 58 may optionally include one or more protuberances disposed on the inner surface 60 that facilitate attachment to the inner panel 14 by vibration or sonic welding.

The seal 70 is adapted to inhibit sound leakage. The seal 70 may have any suitable configuration and be made of any material compatible with the physical and chemical properties of the backplate 50. For example, the seal 70 may be made of TPE (thermoplastic elastomer), TPO (thermoplastic olefin), TEE (thermoplastic elastomer-ether-ester), or EPDM (ethylene propylene diene terpolymer). The seal 70 may have any suitable shape or dimension. For example, the seal may have a width of between 0.5 to 10 mm and a height of between 0.5 to 10 mm.

Referring to FIGS. 2–4, various embodiments of the speaker mounting portion 52 of the backplate 50 are shown. For clarity, common reference numbers are used in reference to each embodiment when possible. In all embodiments, the backplate 50 is disposed between the outer panel 12 and inner panel 14.

FIG. 2 shows a first embodiment of the speaker mounting portion 52. In this embodiment, the flange 58 is attached to the second surface 18 of the inner panel 14. Attachment may be accomplished in any suitable manner, such as by heat staking, sonic welding, vibration welding, or with an adhesive, fasteners, or retaining tabs.

The speaker 40 is disposed co-axially with the aperture 56 and may be attached to the backplate 50 in any suitable manner, such as with one or more fasteners 72. Optionally, the backplate 50 may include a gap 74 disposed around the aperture 56 to provide clearance for the fasteners 72. The seal 70 is disposed between the flange 58 and the inner panel 14 to inhibit sound leakage.

FIG. 3 shows a second embodiment of the speaker mounting portion 52. In this embodiment, the flange 58 is attached to the second surface 18 as previously described. The speaker 40 is disposed co-axially with the aperture 56 and is attached to the outer panel 12 in any suitable manner, such as with one or more fasteners 72. The seal 70 is disposed between the speaker 40 and the backplate 50. Optionally, the seal 70 may be disposed in a groove.

FIG. 4 shows a third embodiment of the speaker mounting portion 52. In this embodiment, the flange 58 is attached to the second surface 18 as previously described. Optionally, the backplate 50 may be attached to the outer panel 12. The speaker 40 is disposed in the aperture 56 and is attached to the outer panel 12 with one or more fasteners 72. The seal 70 is disposed in a slot 76 in the backplate 52. The seal 70 extends through the slot 76 to provide a first sealing surface 78 disposed adjacent to the outer panel 12 and a second sealing surface 80 disposed adjacent to the inner panel 14. The slot 76 may extend around a portion of the aperture 56.

Referring to FIGS. 5 and 6, various cross-sections of the storage compartment 30 are shown. In these embodiments, the storage compartment 30 has two pockets defined by the protruding 28 and recessed portions 54. However, the trim panel assembly may have any number of pockets, protruding portions, and recessed portions.

FIG. 5 shows a cross-section of the first pocket 36 of the storage compartment 30. The protruding portion 28 of the inner panel 14 is disposed adjacent to the recessed portion 54 of the backplate 50. The protruding and recessed portions 28, 54 cooperate to define the first pocket 36. In this embodiment, a portion of the inner panel 14 disposed below the first opening 32 extends further toward the interior of the vehicle than the portion of the inner panel 14 disposed above the first opening 32. The backplate 50 may be attached to the inner panel 14 along the upper and lower flanges 90, 92. A first liner 94 is disposed on the bottom of first pocket 36 along the recessed portion 54.

FIG. 6, shows a cross-section of the storage compartment 30 through the second pocket 38. Similar to FIG. 5, the protruding portion 28 is disposed adjacent to the recessed portion 54 and is attached to the inner panel 14 along upper and lower flanges 90, 92. A second liner 96 is disposed on the bottom of second pocket 38 along both the protruding 28 and recessed portions 54.

The liners 94, 96 are configured to inhibit the movement of objects in the storage compartment 30 and to inhibit the undesirable noises associated with such object movement. The liners 94, 96 may have any suitable shape or dimension. For example, the liners may have a height of between 0.5 to 5 mm.

The seal 70 and liners 94, 96 may be formed of the same material to allow these parts to be made simultaneously, thereby reducing cycle time and increasing process throughput. In one embodiment, the seal and liner material has a higher coefficient of friction that the inner panel or backplate material. Although the seal 70 and liners 94, 96 may be simultaneously formed, they do not need to be physically interconnected.

A method of forming the backplate 50 using a multi-shot or two-shot injection molding process will now be described. Such a process is generally described in U.S. Pat. No. 6,756,004, assigned to Lear Corporation, and is incorporated by reference herein in its entirety. This process allows the manufacture and assembly of a speaker seal and/or a storage compartment liner to be integrated with the manufacture and/or assembly of a trim component to improve quality, reduce manufacturing complexity, and reduce costs.

In a two-shot injection molding process, a first type of material is injected into an injection molding mold to form the backplate. Then, a second type of material is injected into the injection molding mold to form the seal and/or liners. The mold may include one or more cams or slides that are actuated to create relief cavities into which the second material flows. Alternatively, different mold cavities may be employed for the first and second shots. For instance, a portion of the mold having the material from the first shot may be indexed to a second position and mated to another mold portion having appropriate relief cavities before injecting the second type of material.

The process may include the following steps. First, a two-shot injection mold is provided. Second, a first type of material is injected into the mold via runners to form the backplate. Third, a cam is actuated or the mold is indexed to create one or more relief cavities in the mold for the seal and/or liners. Fourth, a second type of material is injected into the mold to simultaneously form the seal and the liners. The assembly is removed from the mold and may be attached to the inner panel or another suitable interior trim component.

Alternatively, the process may include the following steps. First, a two-shot injection mold is provided. Second, the backplate and the inner panel are formed. For example, the backplate and inner panel may be injection molded in different cavities of a common mold. Third, the backplate and inner panel are positioned adjacent to each other to form a storage compartment. For example, the inner panel or the backplate may be ejected from the mold and positioned adjacent to the other component. Fourth, the mold is reconfigured or indexed to accommodate the storage compartment and to create one or more relief cavities for seal and/or liners as previously described. Fifth, a second type of material is injected into the mold to simultaneously form the seal and/or the liners. After both shots have been completed, the assembly is removed from the mold and may be attached to the inner panel or another suitable interior trim compartment.

The multi-shot or two-shot molding process permits seals and/or liners to be integrally formed with the backplate. Integral formation eliminates the expenses associated with purchasing, maintaining, and operating separate production lines for seals, liners, and backplates. In addition, improper assembly of seals and/or liners is avoided since assembly steps are eliminated. Furthermore, the quality of the molded seal and liners is improved because possible gaps due to tolerance accumulation can be anticipated and accommodated through proper selection of the seal and/or liner profiles and configurations. In addition, the amount of material injected can be easily controlled to make up for tolerance difficulties and to reduce waste.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A trim panel assembly for a vehicle, the trim panel assembly comprising:
    a trim panel having a speaker grill, a speaker disposed proximate the speaker grill and a backplate having an aperture configured to channel sound from the speaker to the speaker grill and a flange surrounding the aperture, the backplate being attached to the trim panel along a portion of the flange;
    a storage container having a front wall and a back wall, the front wall being defined by a protruding portion of the trim panel and the back wall being defined by a recessed portion of the backplate; and
    a seal disposed on the backplate to inhibit sound leakage;
    wherein the seal is integrally formed with the backplate.

2. The trim panel assembly of claim 1 further comprising a second panel attached to the trim panel, wherein the speaker is attached to the second panel.

3. The trim panel assembly of claim 1 wherein the speaker is attached to the backplate.

4. The trim panel assembly of claim 1 wherein the seal is disposed on the flange and compresses against the trim panel.

5. The trim panel assembly of claim 4 wherein the backplate is attached to the trim panel along the portion of the flange located between the seal and an outer edge of the backplate.

6. The trim panel assembly of claim 1 wherein the seal is disposed on the flange and compresses against the speaker.

7. The trimpanel assembly of claim 1 wherein a portion of the seal extends through a hole in the backplate and protrudes from the hole to provide sealing surfaces on opposite sides of the backplate.

8. The trim panel assembly of claim 1 wherein the seal is disposed adjacent to speaker.

9. A trim panel assembly for a vehicle, the trim panel assembly comprising:
    a trim panel including:
        a first surface;
        a second surface disposed opposite the first surface;
        a speaker grill; and
        a protruding portion that includes a slot;
    a speaker disposed proximate to the speaker grill; and
    a backplate attached to the second surface, the backplate including:
        a speaker mounting portion located adjacent to the speaker grill and disposed between the speaker and the trim panel;
        a seal disposed on the backplate adjacent to the speaker mounting portion and configured to inhibit sound leakage;
        a recessed portion; and
    a storage container having a front wall and a back wall, the front wall being defined by the a protruding portion of the trim panel and the back wall being defined by the recessed portion of the backplate; and
    a liner disposed in the storage container.

10. The trim panel assembly of claim 9 wherein the backplate is attached to the second surface along a flange portion.

11. The trim panel assembly of claim 10 wherein the seal is located between the flange portion and the second surface.

12. The trim panel assembly of claim 9 wherein the seal is disposed between the speaker and the backplate.

13. The trim panel assembly of claim 9 wherein a portion of the seal extends through an opening in the backplate to provide a first sealing surface disposed adjacent to the trim panel and a second sealing surface disposed adjacent to a second panel.

14. The trim panel assembly of claim 13 wherein the speaker is attached to the second panel.

15. The trim panel assembly of claim 9 wherein the seal is disposed in a groove in the backplate.

16. The trim panel assembly of claim 9 wherein the backplate further comprises an aperture configured to channel sound from the speaker to the trim panel such that the speaker is disposed in the aperture and the seal is disposed between the backplate and the trim panel.

* * * * *

UNITED STATES PATENT AND TRADEMARK OFFICE
CERTIFICATE OF CORRECTION

PATENT NO. : 7,073,843 B2 Page 1 of 1
APPLICATION NO. : 10/818960
DATED : July 11, 2006
INVENTOR(S) : Michael P. Schoemann et al.

It is certified that error appears in the above-identified patent and that said Letters Patent is hereby corrected as shown below:

Col. 6, line 39;

Delete "a protruding" and insert therefor --protruding --.

Signed and Sealed this

Seventh Day of November, 2006

JON W. DUDAS
*Director of the United States Patent and Trademark Office*